United States Patent
Garcés-Erice et al.

(10) Patent No.: US 9,721,102 B2
(45) Date of Patent: Aug. 1, 2017

(54) BOOT MECHANISMS FOR BRING YOUR OWN MANAGEMENT

(71) Applicant: International Business Machines Corporation, Armonk, NY (US)

(72) Inventors: Luis Garcés-Erice, Rueschlikon (CH); John G. Rooney, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 106 days.

(21) Appl. No.: 14/651,551

(22) PCT Filed: Nov. 26, 2013

(86) PCT No.: PCT/IB2013/060409
§ 371 (c)(1),
(2) Date: Jun. 11, 2015

(87) PCT Pub. No.: WO2014/091344
PCT Pub. Date: Jun. 19, 2014

(65) Prior Publication Data
US 2015/0332050 A1    Nov. 19, 2015

(30) Foreign Application Priority Data
Dec. 14, 2012    (GB) .................................. 1222584.3

(51) Int. Cl.
*G06F 9/00*    (2006.01)
*G06F 9/24*    (2006.01)
(Continued)

(52) U.S. Cl.
CPC ............ *G06F 21/572* (2013.01); *G06F 9/441* (2013.01); *G06F 2221/033* (2013.01)

(58) Field of Classification Search
CPC ... G06F 21/572; G06F 9/441; G06F 2221/033
(Continued)

(56) References Cited

U.S. PATENT DOCUMENTS 8,578,443 B2    11/2013    Narain et al.
9,003,173 B2    4/2015    Baribault et al.
(Continued)

FOREIGN PATENT DOCUMENTS

CN    1437106 A    8/2003
CN    101222697 A    7/2008
(Continued)

OTHER PUBLICATIONS

Baentsch et al., "Secure Enterprise Desktop", http://ercim-news.ercim.eu/en90/special/secure-enterprise-desktop, ERCIM news, Special issue on Cybercrime and Privacy Issues, No. 90, Jul. 2012, last printed Dec. 5, 2012, pp. 1-3.
(Continued)

*Primary Examiner* — Robert Cassity
(74) *Attorney, Agent, or Firm* — Scully, Scott, Murphy & Presser, P.C.; David M. Quinn, Esq.

(57) ABSTRACT

The present invention is notably directed to a user portable device (10), preferably a secure tamper-proof device, comprising: a connection interface (12) enabling connection (S2) with a computer (101); a persistent memory (14); and a bootloader (16) stored on said persistent memory (14), preferably on a secure memory (141) of the device, wherein the bootloader (16): is detectable (S3) by a firmware (122) of the computer (101) upon connection (S2) of the device (10) with said computer (101) via said connection interface; and comprises instructions for said firmware (122) to load (S4) the bootloader (16) into a memory (121) of the computer (101) for subsequent execution (S5); and to interact with the firmware, upon execution at the computer (101), to: determine, in a physical storage medium (120) of said computer (101) storing a first host operating system (111-1) and a second host operating system (111-2) respectively on a first portion (120-1) and a second portion (120-2) thereof,
(Continued)

said second portion (120-2), from partition information (111-1*p*) of said physical storage medium, which partition information acknowledges the first host operating system but does not acknowledge the second host operating system; locate a part (BI) of the second host operating system (111-2) in the second portion (120-2); and execute said part (BI), whereby only the second one of the host operating systems can boot (S6-S8) from the user portable device (10). The present invention is further directed to related systems and methods.

14 Claims, 3 Drawing Sheets

(51) Int. Cl.
  *G06F 21/57* (2013.01)
  *G06F 9/44* (2006.01)
(58) Field of Classification Search
  USPC .......................................................... 713/2
  See application file for complete search history.

(56) References Cited

U.S. PATENT DOCUMENTS

| | | | |
|---|---|---|---|
| 2003/0012114 A1* | 1/2003 | Larvoire | G06F 9/441 369/100 |
| 2003/0221115 A1 | 11/2003 | Itoh et al. | |
| 2004/0205396 A1 | 10/2004 | Wu et al. | |
| 2006/0236086 A1 | 10/2006 | Tsuji et al. | |
| 2008/0172557 A1* | 7/2008 | Crowder | G06F 21/31 713/2 |
| 2011/0112819 A1 | 5/2011 | Shirai et al. | |
| 2012/0311659 A1 | 12/2012 | Narain et al. | |
| 2013/0061032 A1 | 3/2013 | Suginaka et al. | |

FOREIGN PATENT DOCUMENTS

| | | |
|---|---|---|
| CN | 101751519 A | 6/2010 |
| CN | 101809536 A | 8/2010 |
| CN | 102063463 A | 5/2011 |
| EP | 2 330 513 A1 | 6/2011 |
| JP | 2006-301771 A | 11/2006 |
| JP | 2008-234220 A | 10/2008 |
| JP | 2009-043133 A | 2/2009 |
| JP | 2011-164845 A | 8/2011 |
| WO | 2011/145199 A | 11/2011 |

OTHER PUBLICATIONS

"IBM Secure Enterprise Desktop", http://www.zurich.ibm.com/secure-ed/, last printed Dec. 5, 2012, p. 1.
Search Report—PCT/IB2013/060409.
Chinese Office Action mailed Nov. 28, 2016.

* cited by examiner

BOOT MECHANISMS FOR BRING YOUR OWN MANAGEMENT

CROSS-REFERENCE TO RELATED APPLICATIONS

This application is based on and claims the benefit of priority from commonly-owned, co-pending on PCT Application No. PCT/IB2013/060409 filed Nov. 26, 2013, which further claims the benefit of priority from commonly-owned United Kingdom Patent Application 1222584.3, filed on Dec. 14, 2012.

FIELD OF THE INVENTION

The invention relates in general to the field of user portable devices used to boot computers. It also relates to the so-called "bring your own" (BYO) computing work environment.

BACKGROUND OF THE INVENTION

BYO generally relates to "Bring your own device" (BYOD), "bring your own technology" (BYOT), or closely related, "bring your own behavior" (BYOB). BYOD or BYOT concerns corporate/business policy of how employees can bring and use personal mobile devices at work and access employers' email, databases and files, while otherwise using such devices at home, whereby personal applications/data are accessed though the same devices. Beyond hardware, BYOB extends this to software used on the device.

Currently many employees have both their own home computer (e.g., laptop) and a computer allocated by their employer. As employees are increasingly comfortable with maintaining their own home computers, employers are moving to a model of computer ownership in which only a single computer is required. An employee may be mandated to use his/her home computer at work. This is attractive to the employers as the system's administration of the computer is in large part delegated to the employee, leading to savings. It is also attractive to the employees as they require only a single computer which they can choose following their own preferences. In addition they often receive compensation from their employers.

However, mixing corporate with personal computation on the same machine blurs the line between what belongs to the employer and what belong to the employee. If no constraint is placed on the software run on this computer then confidential corporate information may be compromised as non-corporate applications distribute or corrupt it. If the employer requires tight control over the computer then the attractiveness to the employee is lost and the employee may worry that corporate monitoring tools are compromising their privacy. There needs to be a clear separation of concerns, with what belongs to whom being easily identifiable.

The use of Virtual Machines (VMs) is often used for defining this separation, with a VM encapsulating an entire executable environment. The VM is often termed a guest operating system with the operating system (OS) on which it is executed being termed the host OS. In one simple mode of operation, the company defines a corporate image and makes this available to the employee in the form of a VM. The VM is then run on the employees' home machine. What runs within the VM is defined by the company while employees keep freedom as to what they run on the physical machine as long as there is a suitable VM manager (e.g. VMWare, Virtual Box) present.

However, while this protects the employee from the employer the contrary is not true. The present invention aims at providing solutions, which also protect the employer from the employee.

Besides, external boot media are often provided on trusted devices (including secure, tamper proof devices), which type of devices is generally known. For example, for online transactions, a solution which has been developed is the so-called Zone Trusted Information Channel (or ZTIC for short). The ZTIC is a secure, non-programmable device for the authentication of transaction data. Since the ZTIC maintains a secured end-to-end network connection to the server, the ZTIC itself is tamper-proof against malicious software attacks and as it has its own input and output components independent of the host it connects to, the data shown on the ZTIC display is genuine. More details can be found in e.g., "The Zurich Trusted Information Channel—An Efficient Defence against Man-in-the-Middle and Malicious Software Attacks", by Thomas Weigold, Thorsten Kramp, Reto Hermann, Frank Höring, Peter Buhler, Michael Baentsch. In P. Lipp, A.-R. Sadeghi, and K.-M. Koch (Eds.): TRUST 2008, LNCS 4968, pp. 75-91, 2008. Springer-Verlag Berlin Heidelberg 2008.

BRIEF SUMMARY OF THE INVENTION

According to a first aspect, the present invention is embodied as a user portable device, preferably a secure tamper-proof device, comprising:
  a connection interface enabling connection with a computer;
  a persistent memory; and
  a bootloader stored on said persistent memory, preferably on a secure memory of the device,
wherein the bootloader:
  is detectable by a firmware of the computer upon connection of the device with said computer via said connection interface; and
  comprises instructions
    for said firmware to load the bootloader into a memory of the computer for subsequent execution; and
    to interact with the firmware, upon execution at the computer, to:
      determine, in a physical storage medium of said computer storing a first host operating system and a second host operating system respectively on a first portion and a second portion thereof, said second portion, from partition information of said physical storage medium, which partition information acknowledges the first host operating system but does not acknowledge the second host operating system;
      locate a part of the second host operating system in the second portion; and
      execute said part, whereby only the second one of the host operating systems can boot from the user portable device.

In embodiments, the user portable device further comprises integrity check data stored on said secure memory, and the bootloader is furthermore configured to check an integrity of said part, based on said integrity check data.

Preferably, the bootloader is configured to check the integrity of said part of the second host operating system by hashing contents of said part and check a resulting hash value against said integrity check data.

In preferred embodiments, the bootloader is furthermore configured, upon execution at said computer, to locate said part by searching it from a given sector of the physical storage medium that starts after, preferably immediately after a last sector used by the first operating system as stored on said physical storage medium.

Preferably, the bootloader is furthermore configured, upon execution at said computer, to calculate a size of the first portion based on partition information of the physical storage medium, and deduce which sector is the last sector used by the first operating system.

In embodiments, the bootloader is furthermore configured, upon execution at said computer, to indirectly locate said part based on:
said given sector; and
data of relative location of said part within said second host operating system as stored on said second portion.

Preferably, the bootloader is furthermore configured, upon execution at said computer, to cause to build an overlay disk over said physical storage medium, to mask a portion of said physical storage medium occupied by the first host operating system, the overlay disk being a physical storage medium software representation backed by said physical storage medium,
wherein, preferably, the bootloader is furthermore configured to cause to build, upon execution at said computer, the overlay disk such that the latter starts on a sector of the physical storage medium after, preferably immediately after a last sector occupied by the first host operating system.

Aspects of this invention further concern a system comprising a user portable device according to any one of the above embodiments and the computer, to which the user portable device is connectable, via said connection interface, wherein the computer has the first host operating system and the second host operating system respectively stored on said first portion and second portion, and wherein partition information of the physical storage medium of the computer acknowledges the first host operating system but does not acknowledge the second host operating system.

Preferably, said part of the second host operating system only comprises:
a kernel of the second operating system, and
software involved upon booting said computer.

According to another aspect, the invention is embodied as a method of booting a computer in a system according to any of the above embodiments, the method comprising, upon connection of the user portable device to the computer:
letting the bootloader of the user portable device be detected by the firmware of the host computer, whereby, as per instructions of the bootloader to the firmware, the bootloader transfers to and executes at the computer, to
locate and execute a part of the second host operating system, such that
the second host operating system boots and only the second one of said host operating systems can boot from the user portable device.

Preferably, the method further comprises:
building an overlay disk over said physical storage medium, said physical storage medium being preferably a physical disk, to mask a portion of said physical storage medium occupied by the first host operating system, the overlay disk being a physical storage medium software representation backed by said physical storage medium;
running the second host operating system on the overlay disk built; and
running software on the second host operating system running.

In preferred embodiments, the method further comprises, prior to building the overlay disk:
reading partition information of the physical storage medium;
deducing from said partition information where the second host operating system is located on said physical storage medium, preferably by calculating a size of a first portion occupied by the first host operating system on said physical storage medium; and
building the overlay disk such that the latter starts on a sector of the physical storage medium after, preferably immediately after a last sector occupied by the first host operating system, and preferably continues until the end of the physical storage medium.

Preferably, running software on the second host operating system further comprises:
running a virtual machine as a guest operating system on the second host operating system, which guest operating system encapsulates an executable environment.

In embodiments, the first host operating system is a personal operating system; and the second operating system is a corporate operating system, and running the virtual machine results in displaying a desktop pertaining to a given user.

According to a final aspect, the invention is embodied as a computer program product comprising a computer-readable storage medium having a bootloader embodied therewith, wherein the bootloader:
is detectable by a firmware of a computer; and
comprises instructions
for said firmware to load the bootloader into a memory of the computer for subsequent execution; and
to interact with the firmware, upon execution at the computer, to:
determine, in a physical storage medium of said computer storing a first host operating system and a second host operating system respectively on a first portion and a second portion thereof, said second portion, from partition information of said physical storage medium, which partition information acknowledges the first host operating system but does not acknowledge the second host operating system;
locate a part of the second host operating system in the second portion; and
execute said part, whereby only the second host operating system can boot upon execution of the bootloader at the computer.

Devices, systems and methods embodying the present invention will now be described, by way of non-limiting examples, and in reference to the accompanying drawings.

DETAILED DESCRIPTION OF THE INVENTION

Figure 1:
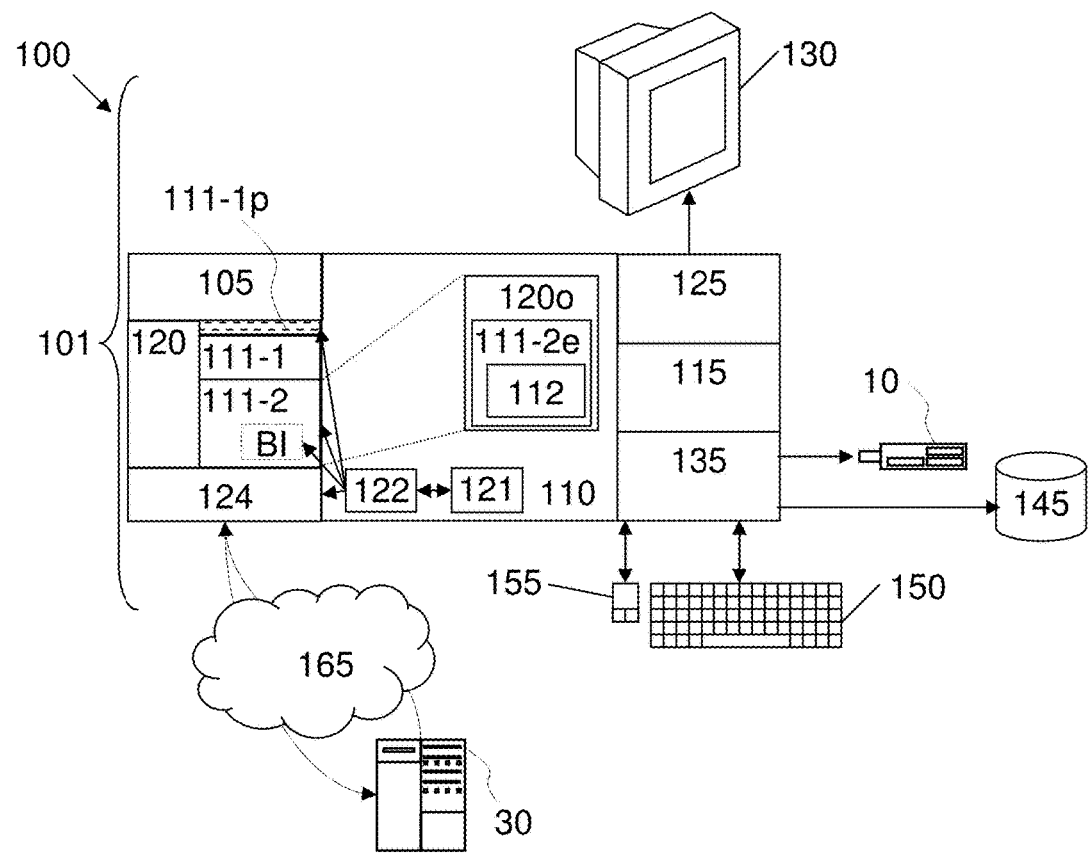
FIG. 1 schematically represents a general computerized system, suited for implementing embodiments of the invention.

The following description is structured as follows. First, general embodiments and high-level variants are described (sect. 1). The next section addresses more specific embodiments and technical implementation details (sect. 2).

1. General Embodiments and High-Level Variants

As discussed in introduction, VMs are often used for defining a home/work environment separation. However, it can be realized that if the host OS is compromised then the corporate VM is also compromised. No management tools running within the VM would allow this to be detected (or at least not early enough), consequently they would still need to be run on the host OS. This in turn requires the employer to control the software in the employee's environment. Thus, the employers must control not only the VM, but also the host OS on which it runs. Hence there is a need for two host OSs, one for the employer and one for the employee. Each of the hosts OS can be allocated a partition on the disk, or two entirely separate disks can be used.

This, it can be realized too, is however not sufficient to solve the problem as each OS can access the disk of the other allowing either host OS to be compromised by the other. An encrypted disk can only be read by someone in possession of a key. However, the entire disk contents of an OS cannot be encrypted as some part of the OS must be executed up to the point that a password can be obtained from the user. The contents of this part of the disk are termed the "boot image". The unencrypted boot image can for instance be read and executed by a bootloader. The boot image then enables access to the rest of the disk by obtaining the key and decrypting it. Someone who obtains the computer can boot it, but will not be able to read the disk containing the data without appropriate password. However, she can reformat the disk and install another OS on it, which, if similar to the former, may remain undetected. Having two host OSs run on the same machine is a situation analogous situation to that of a third party obtaining the machine. One OS may overwrite the disk of the other. Consequently, a compromised home OS can then compromise the corporate OS.

The present invention solves this problem, by ensuring that the corporate environment cannot be compromised by the home OS, or more generally that a first host OS cannot compromise a second OS. Meanwhile, the designed solution places no limit on what is run on the first (home, native) OS. It does not require any changes in the first OS, such as for example adding a dual boot capability or changing partition tables.

The inventive approach followed by the present inventors can be summarized as follow:
- Classic BYO model of computer management mostly suggest relying on VMs to define home/work environment separation;
- This approach was found not satisfying because a compromised host OS may compromise a corporate VM;
- Thus, one is tempted to relying concurrently on two host OSs, each allocated a partition on the disk or two entirely separate disks;
- Inventors have nonetheless realized that this approach has drawbacks as well, since one of the OSs would be able to overwrite the disk of the other, whereby a compromised home OS can compromise a corporate OS;
- An idea that the present Inventors had was therefore to "hide" the second OS to the first one, e.g., the corporate OS is not acknowledged in the partition information of the storage medium, such that the first OS cannot see the second and therefore cannot compromise it;
- But then, a problem that raises is: how to boot the second OS? Indeed, since the second OS is not self-conscious, it can simply not boot.
- Thus, another idea that present inventors had was to make it boot (securely) from an external device, which device is faced with the challenge of locating an OS without knowing where this OS is (as no trace of the second OS can be found in the partition information;
- This difficulty can be overcome thanks to the following trick: since partition information acknowledges characteristics of the first OS, one can determine where the first OS is located on the storage medium, and therefore assume that the second OS is located in the portion left vacant by the first OS.
- An executable part, e.g., a boot image of the second OS can thus be located and the boot process be started.
- Thus, all what is primarily needed is to extract information as to the first OS from the partition table, and deduce therefrom the location of the second OS.
- Advantageously, an overlay disk can be built on the portion occupied by the second OS, such that the latter can in turn be run on this overlay disk, at no risk for the first OS.

These aspects (and many more) of the present invention are now explained in detail. To start with, FIG. 1 represents a general computerized system, suited for implementing embodiments of the invention.

It will be appreciated that the methods described herein are largely non-interactive, and automated by way of computerized systems, such as user devices, personal computers, servers and/or embedded systems. In exemplary embodiments, the methods described herein can be implemented in a partly interactive or non-interactive system. These methods can further be implemented in software (e.g., firmware), hardware, or a combination thereof. In exemplary embodiments, the methods described herein are implemented in software, as an executable program, and is executed by a special or general-purpose digital computer, such as a personal computer, workstation, minicomputer, or mainframe computer. The most general system 100 therefore includes general-purpose computer, e.g., a personal computer 101.

In exemplary embodiments, in terms of hardware architecture, as shown in FIG. 1, the computer 101 includes a processor 105, memory 110 coupled to a memory controller 115, and one or more input and/or output (I/O) devices (or peripherals) 10, 145 that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 145 may generally include any generalized cryptographic card or smart card known in the art. One such device is the user trusted device 10, to be discussed later in detail, notably in reference to FIG. 2.

The processor 105 is a hardware device for executing software, particularly that stored (or loaded) in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions. It may thus consist of several cores/processors as well.

The memory 110 can include any one or combination of volatile memory elements (e.g., random access memory (RAM, such as DRAM, SRAM, SDRAM, etc.)) and non-volatile (persistent) memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105. In particular, memory 110 shall include a given memory portion 121 to which a bootloader 16 (and possibly other modules initially stored on an external device 10) can be transferred for subsequent execution.

The software in memory 110 may include one or more separate programs, each of which comprises a listing of executable instructions for implementing logical functions, notably functions involved in embodiments of this invention. In the example of FIG. 1, memory 110 may be loaded with instructions for enabling the computer 101 to start and complete booting from the user trusted device 10, if some conditions are fulfilled.

In embodiments discussed below, memory 110 can further be loaded with one of two suitable operating systems (OS) 111-1 and 111-2, which are otherwise stored on a physical storage medium 120, e.g., a physical disk. Note, however, that the novel methods discussed here operate at least partly "before" any OS of the host 101 (they operate at another level, closer to hardware, whereby the normal behavior of the computer 101 is impacted). Typically, two operating systems are present: a first OS 111-1, e.g., a native OS meant to be used principally at home, and a second OS 111-2, e.g., a corporate OS. Once (and if) loaded, an OS 111-1 or 111-2 shall essentially control the execution of other computer programs, and provide scheduling, input-output control, file and data management, memory management, and communication control and related services. These two OS typically differ, notably in respect of which other computer programs they control, and the extent of file and data management they allow.

At least part of the methods described herein may be in the form of a source program, executable program (object code), script, or any other entity comprising a set of instructions to be performed. When a source program, then the program needs to be translated via a compiler, assembler, interpreter, or the like, which may or may not be included within the memory(ies) of the device 10 and/or the host 101. Furthermore, the methods can be written as an object oriented programming language, which has classes of data and methods, or a procedure programming language, which has routines, subroutines, and/or functions. In all cases, the novel methods discussed herein are designed so as to operate properly in connection with the firmware 122, and with the device's CPU 11, as needed.

In exemplary embodiments, a conventional keyboard 150 and mouse 155 can be coupled to the input/output controller 135. Other output devices such as the I/O devices 145 may include input devices, for example but not limited to a printer, a scanner, microphone, and the like. Finally, the I/O devices 10, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. As described herein the I/O devices 10, 145 can be any generalized cryptographic card or smart card known in the art. The system 100 can further include a display controller 125 coupled to a display 130. In exemplary embodiments, the system 100 can further include a network interface 124 (e.g., a NIC) for coupling to a network 165. The network 165 can be an IP-based network for communication between the computer 101 and any external server, client and the like via a broadband connection. The network 165 transmits and receives data between the computer 101 and external systems, e.g., a server 30. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) 122. The BIOS is a set of essential software routines that initialize and test hardware at startup, start an OS, and support the transfer of data among the hardware devices. The BIOS is typically stored in ROM so that the BIOS can be executed when the computer 101 is activated.

For the purpose of implementing methods as described herein, the BIOS 122 shall be prompted by a bootloader and interact with the later to determine a hidden OS. More generally though, any suitable firmware 122 or interface to a firmware (i.e., a combination of persistent memory and program code and data stored therein, which operates "below" any operating system in the software stack), can be used to that aim. This typically is the BIOS. However, examples of suitable firmwares 122 or interface thereto include the so-called Extensible Firmware Interface (EFI) BIOS or the Unified Extensible Firmware Interface (UEFI). The latter is a specification that defines a software interface between the operating system and the platform firmware. UEFI is meant to replace the BIOS firmware interface, present in all IBM PC-compatible computers today. In practice, most UEFI images have legacy support for BIOS services. More generally, any firmware having legacy support for BIOS services or comparable services can be contemplated for the purpose of implementing methods described herein. Even more generally, any initialization firmware operating below the operating system in the software stack may potentially convene for the purpose of implementing the present invention.

When the computer 101 is in operation, the processor 105 is configured to execute software stored within the memory 110, to communicate data to and from the memory 110, and to generally control operations of the computer 101 pursuant to the software. The methods described herein, in whole or in part, but typically the latter, are read by the processor 105, possibly buffered within the processor 105, and then executed.

The portions of the methods described herein that can be implemented in software can be stored on any computer readable medium for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely firmware and/or software embodiment (including firmware/software, resident software, micro-code, etc.) or an embodiment combining firmware/software and hardware aspects that may all generally be referred to herein as "modules", "system", or "process", "scheme", etc. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, or partly on the user's computer (as a stand-alone software package), or still partly on two or more of the following: the user's computer, the user trusted device, and a remote computer. The host computer and the server may be connected through any type of network, including: local area network (LAN); wide area network (WAN); connection to an external computer (Internet, using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to processor(s) of a computer (general or special purpose computer, or other programmable data processing apparatus) and/or a user portable device, to produce a machine, such that the instructions, which execute via said processor(s) create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the functions/acts specified in the flowchart and/or block diagram block or blocks.

The computer program instructions may also be loaded onto a computer, other programmable data processing apparatus, or other devices to cause a series of operational steps to be performed on computerized devices to produce a computer implemented process such that the instructions which execute on the computerized devices for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring generally to FIGS. 1 to 5, an aspect of the invention is first described, which concerns a user portable device 10. This device essentially comprises:

a connection interface 12, e.g., an USB connection interface, enabling connection with a personal computer 101;

a persistent memory 14, which preferably includes a secure memory 141; and a bootloader 16 provided with novel computerized methods, and stored on said persistent memory 14.

The bootloader 16 is designed such as to be detectable by an initialization firmware 122, e.g., the BIOS of the computer 101 upon connection of the device 10 with computer 101 via said connection interface 12, e.g., upon restarting the computer 101. This functionality can for instance be provided as per the data structure of the bootloader itself (conveniently stored on the device 10), as known per se. The bootloader further comprises instructions for said firmware 122 to load the bootloader (or modules or subparts thereof) 16 into a memory 121 of the computer 101, for subsequent execution at the computer.

Furthermore, the bootloader 16 is specifically designed to interact with the firmware 122 (while executing at the computer 101), to perform a number of unusual tasks, which aim at ensuring that only one of two OSs that coexist on computer 101 can boot from the secure device 10, even when said one of two OSs is hidden, i.e., not acknowledged by partition information of the physical storage medium 120 of the computer 101.

The context assumed is the following: the physical storage medium 120 of the computer 101 stores a first host OS 111-1, e.g., a native OS (also called "home" OS) and a second host OS 111-2 (e.g., a "corporate" OS). The operating systems 111-1 and 111-2 (or at least part thereof) are respectively stored on a first portion 120-1 and a second portion 120-2 of the physical storage medium 120. In addition, it is assumed that partition information 111-1p of the medium 120 does not acknowledge the second OS 111-2. In other words, the second OS is hidden (to the first OS). Independently from this assumed context, the specific functions of the present bootloader described below do not make use (and even preferably ignore) any information about the second OS in the partition information 111-1p, should such information nonetheless be available, although it should preferably not be).

Precisely, upon execution at the computer 101, the bootloader 16 is designed to perform the following operations:

First, it determines the second portion 120-2 of the medium 120, i.e., the portion used by the second OS 111-2, and notably where the second portion starts. Yet, since the partition information 111-1p used by the bootloader does not (and is generally assumed not to) acknowledge the second OS 111-2, the bootloader needs to indirectly determine the second portion, using only this partition information 111-1p, which only acknowledges the first one of the OSs.

Second, the bootloader shall locate a given part ("BI" in the accompanying drawings) of the second OS 111-2, in the second portion 120-2. This part preferably is a boot image, or more generally any executable part, which upon execution would contribute to make the second OS continue to boot; and Finally, execute the located part BI, whereby only the second one of the OSs can effectively boot from the user portable device 10.

Figure 3:
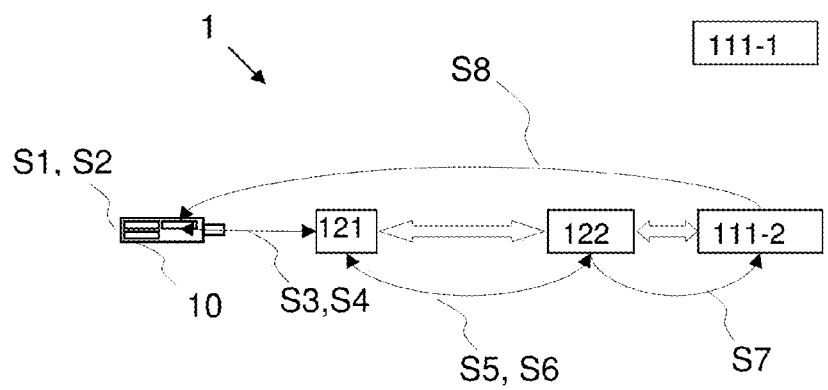
FIG. 3 schematically illustrates selected components of the computerized system of FIG. 1, together with a flowchart illustrating steps of a method according to embodiments.
Figure 4:
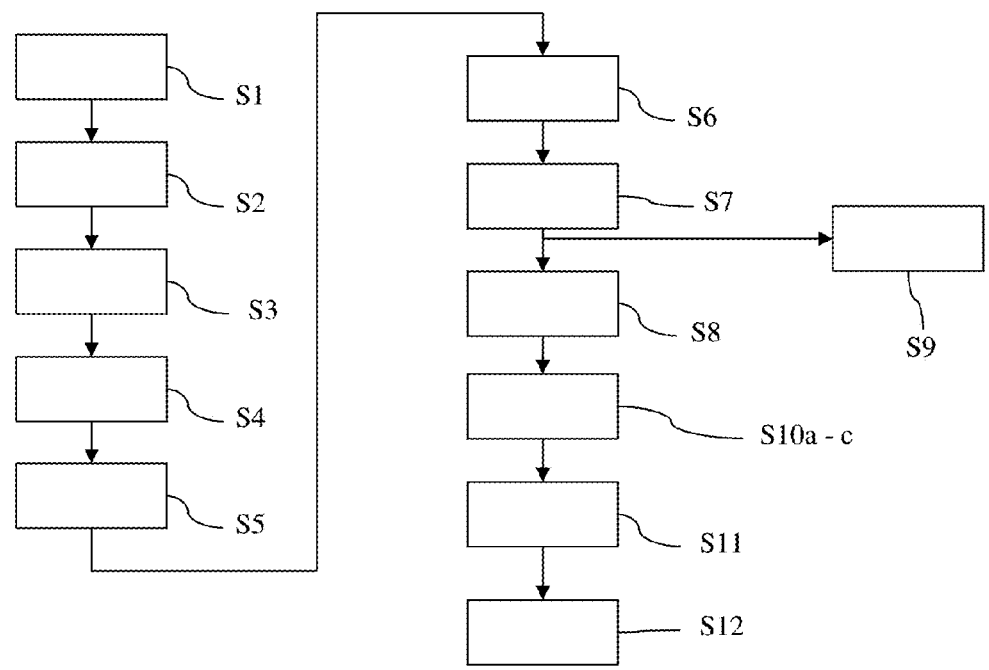
FIG. 4 is a flowchart illustrating high-level steps of a method for enabling a computer to securely boot from a user device, according to embodiments.

Conversely, and according to another aspect, the invention can be embodied as a method of booting a personal computer 101, which is illustrated in FIGS. 3 and 4. Assume that a portable device 10 such as described above and a computer 101 are provided in an initial step S1, then the method comprises, upon connection of the portable device 10 to computer 101 (S2), the following steps:

Step S3: letting the bootloader 16 be detected by the firmware 122, whereby, as per instructions of the bootloader 16 to the firmware:

the bootloader transfers (step S4) to and executes (step S5) at the computer 101, to:

subsequently locate (step S6) and execute (S8) the part BI of the second OS 111-2, such that:

the second OS boots (steps S8-S11) and only the second one of said OSs can boot from the user portable device 10.

The bootloader 16 interact with the firmware 122, e.g., the BIOS, to perform various kinds of operations; it further interacts with the firmware somehow continuously as the firmware is needed to perform basic operations.

The invention extends to systems comprising a user portable device 10 and computer 101 as discussed above.

Since (i) only the second OS can boot from the user portable device 10 and (ii) the first OS is not involved in the process, the present solution allows to start the second OS, e.g., a corporate OS, and for the latter to be run on a home computer without requiring to execute the native OS. As to be explained later in detail, the needed configuration elements can be accessed from partition information, which information is essentially independently from the native OS. Thus, the native OS needs not be started, which lowers the risk of tampering with the second OS.

A reasonable assumption made is that that the user can shrink the partition of the native OS such that enough free space is available on disk to store the second OS. This is for instance achievable through a simple mouse click on OSs such as Windows 7 and OSX.

Figure 2:
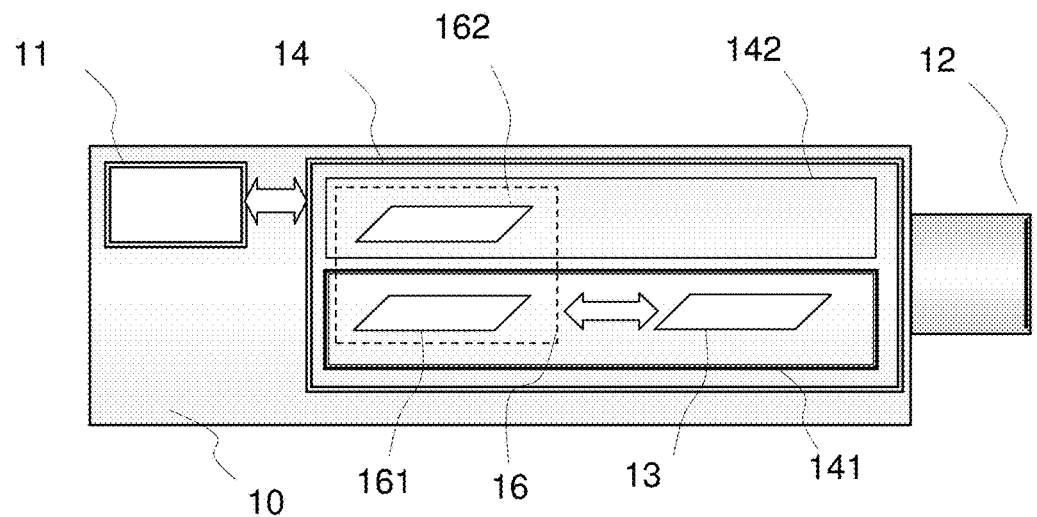
FIG. 2 is a simplified representation of selected components of a user portable device, according to embodiments, and how these components interrelate functionally.

Referring now more specifically to FIGS. 2, 3 and 4: in embodiments, the user portable device 10 may further comprise integrity check data 13 stored on memory 14. The bootloader may furthermore be configured to check (step S7) an integrity of the part BI previously located by the bootloader, using said integrity check data 13.

Checking integrity of the part BI can be regarded as a first step of a chain of trust, wherein a trusted bootloader 16 verifies the integrity of the located part, e.g., a boot image (be it encrypted or not), through predefined and pre-stored information. Next, the boot image may verify the integrity of the rest of the OS through interaction with the user, as usual in the art.

In that case the device 10 is preferably a secure, tamper-proof device, i.e., the integrity check data 13 are preferably stored on a secure memory 141. It makes more sense indeed to verify the integrity of the located part BI with a secure device, as there would, else, be a risk that the bootloader has been tampered with.

In embodiments, the bootloader 16 may be configured to check the integrity of the located part BI of the second host operating system 111-2 by hashing contents of said part and check a resulting hash value against said integrity check data 13. It is in that case sufficient to store on the device 10 a hash of the contents of the part BI, e.g., an unencrypted boot image, and compare this with that found on disk at every boot. Note that, preferably, the boot image contains only the kernel of the OS 111-2 plus a few libraries, e.g., those needed during the boot process and consequently the boot image can be quite small.

Alternatively, if the part BI is encrypted, then one may want to decrypt said part BI using a key 13 comprised in said integrity check data, which provides another means of testing the integrity of the located part. This provides better security than simply ensuring the integrity of the contents, but increases the complexity of updating the software.

In variants, the boot image may be stored on the trusted device, and transferred to the computer 101 prior to locate (step S6) and execute (step S8) it. This ensures the integrity of the boot image, although it requires more storage on the device 10 and more frequent updates.

Figure 5:
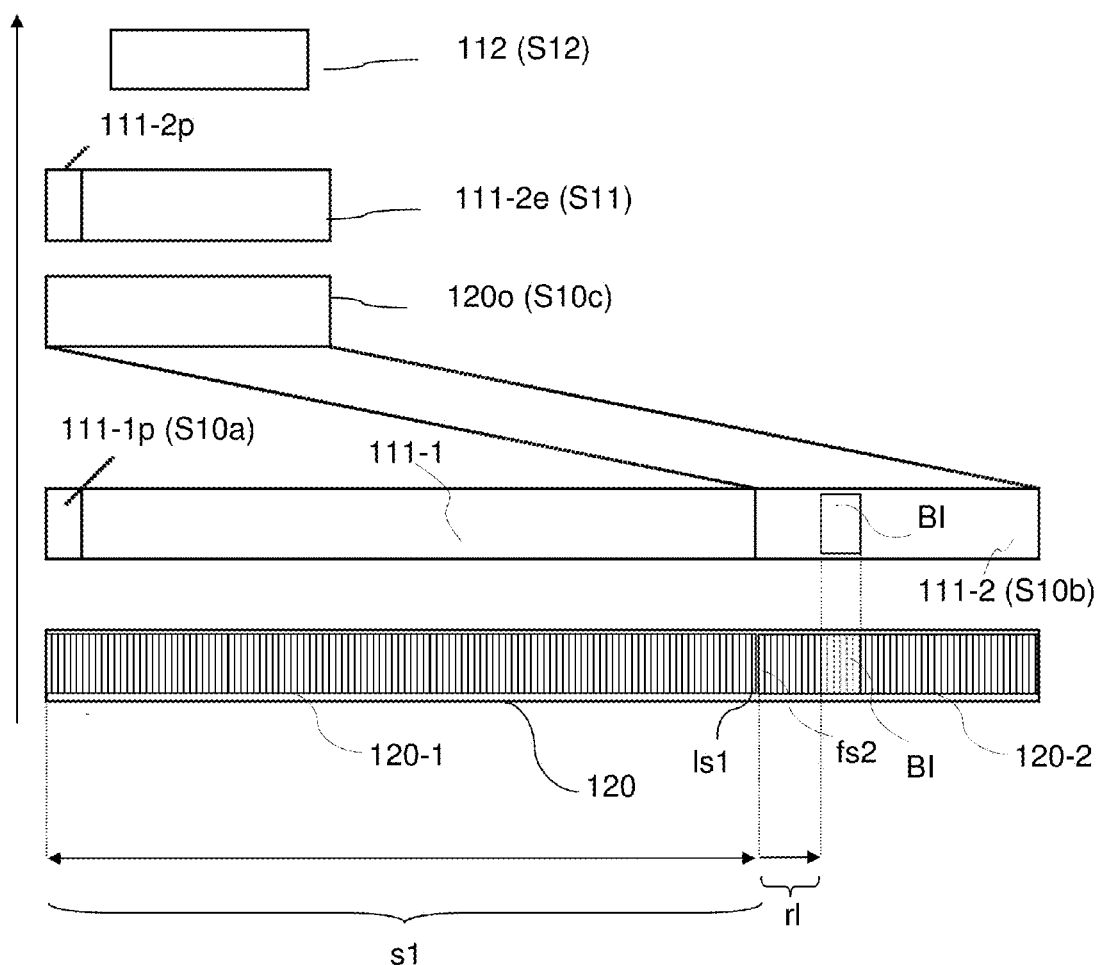
FIG. 5 schematically illustrates the construction of an overlay disk built over a physical storage medium, as involved in embodiments.

Referring now to FIG. 5, since the second OS 111-2 is preferably hidden, the bootloader 16 may read (step S10a) partition information 111-1p of the first OS 111-1 to deduce (step S10b) from said partition information where the second OS 111-2 is located on the physical storage medium 120. This may require to calculate a size s1 of the first portion 120-1 occupied by the first OS 111-1 on said physical storage medium 120.

For instance, assuming that the first host OS 111-1 and the second host OS 111-2 reside on a same physical storage medium 120, such as a physical disk, of the computer 101, the bootloader 16 may be configured to locate, upon execution at said computer 101, said part BI by searching it from a given sector fs2 of the physical storage medium 120, which sector fs2 that starts after (e.g., immediately after) the last sector ls1 used by the first OS 111-1 (as stored on said physical storage medium 120). Which sector ls1 is the last sector used by the first OS 111-1 may even be, in some circumstances at least, directly available or easily computed from the partition information 111-1p, which information is read by the bootloader at step S10a. Assuming that the second OS 111-2 is stored after (e.g., immediately after) the first OS 111-1, the bootloader may start searching it from sector fs2, step S10b, as illustrated in FIG. 5.

Now, depending on other configuration information available from the partition information, the bootloader may start searching the second OS 111-2 from a sector fs2 that is not immediately after sector ls1, but instead remote from ls1, as the partition information may reveal that a number of intermediate sectors are used for another purpose than the first or second OS.

Depending on the amount of information assumed by default (context-dependent) or that is directly available from the partition information 111-1p, the bootloader may furthermore need to calculate the size s1 of the first portion occupied on the physical storage medium by the first OS 111-1. Knowing the size s1, which sector ls1 is the last sector used by the first OS is easily deduced, as the sector size is known or available, e.g., from computer specification. Note that in some specific contexts, some policy requirements may restrict the choice of allowed native OSs to one or a few OS versions, such that the size of the OS may be known by default, whereby the step of calculating the size of the first OS can be skipped in some cases.

Next, since the part BI is not necessarily stored on the first sectors occupied by the first OS 111-2, the bootloader 16 may have to indirectly locate said part BI. This can be achieved thanks to information as to the relative location r1 of the part BI within said second portion 120-2, in addition to data identifying said sector ls1. The relative location r1 of the part BI may be known by the device 10 (stored thereon), or otherwise available at a server 30 to which the device 10 may connect (be it directly or not).

These last two embodiments concerns more particularly the cases where the PC 101 is provided with a single storage disk, and both OSs share this disk. In order to not to have to change the first (native) OS during the boot process of the second OS, one needs to recognize from the bootloader where on disk the second OS is located. Normally this information would be stored within the partition table 111-1p at the start of the disk 120, but this could then be noticed from the native OS, a thing that is not desired in the present context. Thus, on the contrary, in systems according to the present invention, one preferably avoids this information to be present. Instead the bootloader reads the partition table of the native OS found at the start of the disk and, e.g., calculates how much space it takes on disk. Essentially, the size of the first OS is the fraction of the disk covered by the existing partitions. The bootloader then assumes that the second OS will be found starting on a sector after the home OS on disk. Next, the bootloader may use mechanisms as described earlier to locate the part BI, determine its integrity, and execute it.

Interestingly, the bootloader may further be configured to cause to build (step S10c) an overlay disk 120o over the physical storage medium 120 (e.g., a physical disk), to mask a portion of said physical medium 120 occupied by the first OS 111-1. Such an overlay disk is a software representation of the physical storage medium, backed by said physical storage medium, which can be (a) an actual physical storage device, such as a disk, etc., or (b) a plurality of such storage device or, still (c) a portion of a physical storage device.

The construction of the overlay disk may benefit from information already extracted: for instance the bootloader may build the overlay disk such that the latter starts on sector fs2, i.e., immediately after sector ls1.

Correspondingly, present methods may further comprise the following steps:
  S10c: the overlay disk 120o is built over the physical storage medium 120;
  S11: the second host is run OS 111-2e on the overlay disk 120o built; such that
  S12: software 112 can be run within the framework of the second host OS 111-2e, while the latter is running.

Note that reference 111-2e denotes the second OS while running, i.e., once loaded in memory and executing, whereas 111-2 stands for the second OS as stored on the medium 120.

Without the overlay disk construction, one would for instance need either a partition or an entire disk for the second OS. However, in both cases the second OS would then be detectable by the first OS, such that the first OS could compromise the second OS. Now, if the second OS is encrypted, then the first OS cannot access the second OS, but still could overwrite it. Thus, building an overlay disk is preferred.

As known in the field of computer storage, methods of logical volume management (or LVM) are known, which allow for allocating space on mass-storage devices. Such methods are more flexible than conventional partitioning schemes. In particular, a volume manager can concatenate, stripe together or otherwise combine partitions into larger virtual ones that administrators can re-size or move, potentially without interrupting system use, see e.g., Wikipedia's page http://en.wikipedia.org/wiki/Logical_volume_management. In the present case, a volume manager could be relied upon to allocate a portion of the storage medium 120, to create a virtual memory portion used by the second OS as its main "disk". A number of volume manager technologies are available which could be used in that respect.

The bootloader may be equipped with methods for constructing the overlay disk. Preferably yet, this is not the bootloader that directly constructs the overlay disk but the boot image, e.g., the kernel of the second OS plus initial RAM disk, that the bootloader locates and loads into memory. In all cases, the bootloader can be designed to cause (e.g., the boot image BI) to build the overlay disk 120o over the physical storage medium 120, upon execution at the computer 101.

Software 112 may for instance be a virtual machine running as a guest OS, which encapsulates an executable environment. This is especially advantageous in contexts as contemplated herein, where the first host OS 111-1 is a native OS and the second OS 111-2 is a corporate OS, to enable a secure BYO model of management. The guest OS may notably result in displaying a desktop pertaining to a given user, as per a given corporate policy.

As already evoked while describing the device 10, preferred methods may further comprise, prior to building the overlay disk, the steps of:

S10a: reading partition information 111-1p;

S10b: deducing from said partition information where the second host OS 111-2 is located on said physical storage medium; this is preferably achieved by calculating a size s1 of a first portion occupied by the first host OS on said physical storage medium 120; and S10c: building the overlay disk such that the latter starts on sector fs2 located after, preferably immediately after the last sector ls1 occupied by the first host OS.

Thanks to the overlay disk construction, it is easily made possible for the second OS to continue booting, i.e., the second OS shall find its own disk, that is, the fraction of the disk that it uses. Also, the second OS when running shall "believe" that it has an entire disk for itself due to its construction (the overlay disk preferably continues until the end of the storage medium). There are a variety of ways of constructing such an overlay disk. A preferred embodiment is to use a device-mapper construct, e.g., available with an hypervisor to create the overlay disk. Note, however, that the hypervisor plays no role unless the second OS needs to run in a VM (the hypervisor is unrelated to the overlay, which may be implemented by an OS with or without a hypervisor).

On the other hand, the native OS perceives the space used by the second OS as simple vacant space that is outside of its scope to use. The native OS is thus completely unaware of the existence of the second OS. In order to remove all trace of the second OS it would be sufficient to reclaim this "vacant" space.

Referring now to FIGS. 1, 2 and 5 altogether, and as touched earlier, the invention may also be embodied as a system 100 that comprises the portable device 10 and the computer 101. The first host OS 111-1 and the second host OS 111-2 are respectively stored on the first portion 120-1 and the second portion 120-2 of the storage medium 120. Partition information of the physical storage medium of the personal computer acknowledges the first host operating system 111-2 but does not acknowledge the second host operating system 111-2.

Preferably, the part BI of the second host OS only comprises a kernel of the second operating system, as well as software involved upon booting the computer, i.e., those software libraries needed to boot, which may include software needed for building the overlay disk, as discussed above.

Also, as evoked earlier, the firmware 122 is preferably one of the following:
 a BIOS;
 an Extensible Firmware Interface EFI; or
 a Unified Extensible Firmware Interface UEFI Next, referring back to FIG. 2, the persistent memory 14 shall preferably comprise:

a secure memory 141, onto which is preferably stored a first part 161 (or given portions) of the bootloader 16 (and/or additional modules of the device 10); and a non-secure memory 142, e.g., a SD card, onto which is stored a second part 162 (or other portions) of the bootloader.

The presence of a secure memory makes the user trusted device a secure device. For example, a part of the module 16 may reside encrypted on the non-secure memory 142, while a corresponding encryption key is stored on the secure memory 141. The secure memory is typically limited to 128 ko or 256 ko, for cost reasons. It is thus preferably used to primarily store encryption data, e.g., hashes/signatures 13. Yet, a part 161 of the bootloader can reside on the secure memory 141 while other parts 162 thereof may reside encrypted on the non-secure memory. In variants, the bootloader 16 resides on a SD card, yet encrypted with signature residing on the secure memory 141. When computer 101 requests a given block or any data chunk of the bootloader 16, then the device's CPU 11 may be prompted by software residing in memory 14 to decrypt the requested block, e.g., using encryption data stored on the secure memory 141.

The connection interface 12 of the device 10 may for instance be of the following type:
 Universal Serial Bus or USB;
 External Small Computer System Interface or SCSI;
 External Serial Advanced Technology Attachment or SATA;
 Firewire; or
 Thunderbolt.

More generally though, this could be any current or future connector that allows the computer to boot from the external device 10. In addition, the same interface 12 may allow the user trusted device 10 for communicating with any external device such as a beamer, a printer, or any other output device.

As usual, the user trusted device 10 may be provided with processing means (or computing means, i.e., CPU) 11, such as a crypto processor, coupled to a memory, which more generally comprises the persistent memory 14 and, preferably, a non-persistent memory too (not explicitly shown but it can be considered to be part of the processing means 11).

In the present context, the persistent memory notably stores computerized methods, beyond the bootloader evoked above, to be at least partly executed by the processing means 11. Of course, the various functions of the device described herein could be considered as a one and a same (super) module provided with different functions, and able to execute at the computer 101, or partly at the computer 101 and at the device 10.

If necessary, the secure device 10 has a card reader to read user credentials stored on a memory card, e.g., the non-secure memory 142 or any smart card. Suitable use can safely be made out of such data, e.g., user credentials as stored on the card. In particular, a trustworthy connection can be established between a user (or strictly speaking the device 10) and a third party, e.g., server 30, via the host 101 and using such data. In a variant, the user credentials may be stored directly on the secure device. Further interfaces (like control buttons and display) may be provided to allow for interaction with the user.

Finally, as touched earlier, the device 10 or the bootloader 16 may further be designed to connect to an external entity 30, e.g., a server. This functionality may for instance be provided by a specific connection module of the device 10. This module may be executed on the device 10 or on the computer 101 to instruct to connect to server 30, preferably via computer 101. Connection to the server 30 can be implemented in several ways. Most advantageous is to connect to the server 30 via the computer 101, with or without the help of the second OS. Data sent to the server is encrypted on the device 10 and the data received from the server 30 is decrypted by the device 10. This ensures end-end security of the communication channel.

For example, a connection module may interact with the firmware 122 to subsequently interact with the network card 124 of the computer 101, this, in order to initiate a communication over the network 165, as enabled by the network card 124, such that the server 30 can be contacted. Thus, in that case, the connection module relies on the host computer's firmware to enable a communication with the external entity, such that the device needs no built-in network cards or network enabling devices, nor it needs to store drivers for the network card 124 of the host 101. Now, instead of using the firmware 122 to initialize the network card 124, the connection module may access network card drivers stored on the device 10 to directly interact with the network card 124, whereby an external entity 30 could be contacted as well. In that case, however, suitable network card drivers need to be stored, and possibly updated, in the device 10. Still, as a more "radical" alternative, one may prefer to have the device 10 equipped with network access means, e.g., with a network device (wired or wireless), such as to connect directly to a server. In that case, the connection module executes at the device. Such a solution is somewhat more expensive. However, latency is reduced since no additional interactions with the computer 101 are needed to contact the server.

The above embodiments have been succinctly described in reference to the accompanying drawings and may accommodate a number of variants. Several combinations of the above features may be contemplated. Examples are given in the next section.

2. Specific Embodiments/Technical Implementation Details

Specific embodiments are described in this section, in which the following options are assumed:
  The first OS is a native (home) OS, the second OS is a corporate OS; and
  The executable part BI located by the bootloader is a boot image; As explained in details in the previous section, the present approach relies on a bootloader 16 resident on an external device 10. Conveniently this device has a USB connector 12 as all modern firmware is capable of recognizing such devices. The bootloader is at least partly 161 stored on tamper proof storage 141 on the device meaning that it may not be changed other than by an authorized entity.

The user device 10 and computer 101 are provided at step S1. The trusted device is inserted into the machine 101 and the machine is turned on (step S2). The firmware 122 of the machine recognizes the trusted device 10 and identifies that it is bootable (step S3). The bootloader 16 is loaded (step S4) into the memory 121 of the machine by the firmware and executed (step S5).

As discussed earlier, the bootloader is configured to access the section of the disk 120 of the computer 101 that contains the boot image BI. Once the boot image is located (step S6) on the disk, the bootloader may either simply test the integrity of the contents of the unencrypted boot image or it may decrypt the boot image using keys 13 stored on the trusted device 10 (step S7).

In the former case it is sufficient to store on the device 10 a hash 13 of the contents of an integral boot image and compare this with that found on disk at every boot. The boot image may only contain the kernel of the OS plus some libraries useful during the boot and consequently is quite small.

In the latter case, the bootloader may decrypt the boot image using a stored key 13. This provides better security than simply ensuring the integrity of the contents, but increases the complexity of updating the software. Alternatively, the boot image may itself be stored on the trusted device. This ensures the integrity of the bootloader, but requires more storage on the trusted device and also requires more frequent updates in practice.

The device 10 is preferably equipped with a screen and a means of accepting or rejecting a request. The user can thus be prompted to confirm that the bootloader and/or keys should be made available. The environment then consists of two host OSs 111-1, 111-2, one for home and the other one for corporate use. Yet, only the second one 111-2 is bootable when the device 10 (provided by the employer) is present. If the home OS installs a new OS on a second disk of the machine 101, this will not be bootable by the trusted device. The present scheme involves a chain of trust in which a trusted bootloader 16 verifies the integrity of a boot image through prestored or otherwise obtainable information, and the boot image verifies the integrity of the rest of the OS through interaction with the user. The trusted device is required to store a bootloader 16 and some additional information 13, e.g., a hash value or a key, that is, integrity check data. It can be encoded in a few hundred kilobytes of data and can be expected to change rarely. The boot-image resident on disk contains the kernel of the corporate OS and some useful drivers and applications. It can be encoded in tens of megabytes and can be expected to change as often as the kernel and critical libraries are required to be patched. Updating these components takes place remotely. The boot image is executed at step S8. Once a trusted corporate environment 111-2e is running (step S11) it can be verified if the components are up-to-date and if not they can be modified.

In preferred embodiments, the host OS 111-2 of the employer is not be modifiable by the employee, such that a single unique image can be deployed to all employee, a thing that enhances security and simplifies the updating of the system. The corporate host OS 111-2 is then simply the means to safely run the corporate VM assigned to the employee. This VM can be customized for the employee in terms of the software it executes and can be modified by the user in the same way as their normal desktop machine. When the machine is to be used for home use, it is simply turned on and boots the corresponding disk or disk partition. When the machine is to be used for company use, the trusted device 10 supplied by the company is inserted by the user. The firmware reads the bootloader stored on this device into memory, this bootloader reads and tests integrity of the boot image stored on disk. If the boot image is integral, then the boot image mounts the encrypted root file system of the company host OS. The VM are then stored as files on this file system and may then be executed, step S12.

As the corporate VMs are executed on the corporate host OS, the company is free to choose any OS as the host OS so long as it support the an appropriate virtual machine manager. For example, the corporate VM may be a Windows 7 desktop machine, while the corporate host OS is Linux.

In preferred embodiments, the host OS 111-2 support an explicit boot image BI. If this is not the case then a boot image may be extracted from the OS, using an image preparation phase performed when the image is created or another OS may be used as the boot-image.

The bootloader is furthermore provided with additional functionalities, which are especially advantageous if the machine 101 has a single disk 120 and both the home and corporate OS share this disk. In order to not to have change the home OS during the boot process of the corporate OS, one must be able to recognize from the bootloader where on disk the corporate OS is located. Normally this information would be stored within the partition table at the start of the disk, but this could then be noticed from the home OS, and thus is not acceptable in the present context. Instead the bootloader reads the partition table of the home OS found at the start of the disk and calculates how much space it takes on disk (essentially, the size of the home OS is the fraction of the disk covered by the existing partitions). It then assumes that the corporate OS will be found starting on the sector after the home OS on disk to locate it (step S6). The bootloader uses the hashing mechanism described previously to check the integrity of the boot image of the corporate OS (step S7) and loads it into memory for booting, step S8. The boot image is stored in some predefined location inside the corporate OS disk.

Also, for the corporate OS to find its own disk (i.e., the fraction of the disk that it uses) and continue booting, the boot process advantageously constructs (step S10a-c) an overlay disk 120o over the actual physical disk 120, thereby masking the part of the disk that is used by the native home OS. In order to do this it reads (S10a) the native partition table and constructs (S10c) the overlay disk such that it starts on the sector after the last one used by the native OS and continues until the end of the disk. We assume that the user has shrunk the partition of the native OS such that enough free space is available on disk to store the corporate OS. The native OS perceives the space used by the corporate OS as simple vacant space that is outside of its scope to use. The native OS is otherwise completely unaware of the existence of the corporate OS. In order to remove all trace of the corporate OS it is sufficient to reclaim this vacant space. The corporate OS when running believes it has an entire disk to itself due to the construction of the overlay disk. The construction of the overlay disk is illustrated in FIG. 5.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated. For example, the device 10 could be powered with solar cells or any other suitable batteries, etc. As touched earlier, the computerized methods described herein have been categorized according to their main functions: namely having the bootloader transferred (step S4) to and executed (step S5) at the computer (101), to locate (step S6) and execute (step S8) an executable part BI of the second host operating system. These main functions have been described as being assigned to a bootloader. However, embodiments of the present invention could be equivalently described with the same functions distributed over two or more modules, each meant to provide one or more of these functions.

REFERENCE LIST

10 User Trusted Device
11 Secure Device's CPU
12 Connection Interface
14 Persistent Memory
16 Bootloader/Boot Enabling Data Structure
30 Server
100 General Computerized System
101 Host Computer
105 Processor
110 Memory
111 Operating System (OS)
115 Memory Controller
120 Physical Storage Medium (Physical Disk)
120-1 First Portion Of Physical Storage Medium 120
s1 Size Of First Portion Of Physical Storage Medium
ls1 Last Sector Of First Portion Of Physical Storage Medium
120-2 Second Portion Of Physical Storage Medium
fs2 First Sector Of Second Portion Of Physical Storage Medium
122 Firmware (BIOS) Of The Host Computer
124 Network Card
125 Display Controller
130 Display
141 Secure Memory
142 Non-Secure Memory
145 I/O Devices (Or Peripherals)
150 Keyboard
155 Mouse
161 First Part Of Bootloader
162 Second Part Of Bootloader
165 Network

The invention claimed is:

1. A user portable device (10), preferably a secure tamper-proof device, comprising:
a connection interface (12) enabling connection (S2) with a computer (101);
a persistent memory (14); and
a bootloader (16) stored on said persistent memory (14), preferably on a secure memory (141) of the device, wherein the bootloader (16):
is detectable (S3) by a firmware (122) of the computer (101) upon connection (S2) of the device (10) with said computer (101) via said connection interface; and
comprises instructions
for said firmware (122) to load (S4) the bootloader (16) into a memory (121) of the computer (101) for subsequent execution (S5); and
to interact with the firmware, upon execution at the computer (101), to:
determine, in a physical storage medium (120) of said computer (101) storing a first host operating system (111-1) and a second host operating system (111-2) respectively on a first portion (120-1) and a second portion (120-2) thereof, said second portion (120-2), from partition information (111-1p) of said physical storage medium, which partition information acknowledges the first host operating system but does not acknowledge the second host operating system;

locate a part (BI) of the second host operating system (111-2) in the second portion (120-2); and execute said part (BI), whereby only the second one of the host operating systems can boot (S6-S8) from the user portable device (10), wherein the bootloader is furthermore configured, upon execution at said computer (101), to calculate a size of the first portion based on partition information (111-1p) of the physical storage medium, and deduce which sector (ls1) is the last sector used by the first operating system.

2. The user portable device (10) of claim 1, wherein the user portable device further comprises integrity check data (13) stored on said secure memory (141), and wherein the bootloader is furthermore configured to check (S7) an integrity of said part (BI), based on said integrity check data (13).

3. The user portable device of claim 2, wherein the bootloader (16) is configured to check the integrity of said part (BI) of the second host operating system (111-2) by hashing contents of said part and check a resulting hash value against said integrity check data (13).

4. The user portable device (10) of claim 1, wherein the bootloader is furthermore configured, upon execution at said computer (101), to locate said part (BI) by searching it from a given sector (fs2) of the physical storage medium (120) that starts after, preferably immediately after a last sector (ls1) used by the first operating system as stored on said physical storage medium.

5. The user portable device (10) of claim 1, wherein the bootloader is furthermore configured, upon execution at said computer (101), to indirectly locate said part (BI) based on:
said given sector (ls1); and
data of relative location (r1) of said part (BI) within said second host operating system (111-2) as stored on said second portion (120-2).

6. The user portable device (10) of claim 1, wherein the bootloader is furthermore configured, upon execution at said computer (101), to cause to build (S10a-b) an overlay disk (120o) over said physical storage medium (120), to mask a portion of said physical storage medium occupied by the first host operating system (111-1), the overlay disk being a physical storage medium software representation backed by said physical storage medium, wherein, preferably, the bootloader is furthermore configured to cause to build, upon execution at said computer (101), the overlay disk such that the latter starts on a sector of the physical storage medium after, preferably immediately after a last sector occupied by the first host operating system.

7. A system (1) comprising a user portable device (10) according to claim 1 and the computer (101), to which the user portable device is connectable, via said connection interface (12), wherein the computer (101) has the first host operating system (111-1) and the second host operating system (111-2) respectively stored on said first portion and second portion, and wherein partition information of the physical storage medium of the computer acknowledges the first host operating system (111-2) but does not acknowledge the second host operating system (111-2).

8. The system of claim 7, wherein an unencrypted part (BI) of the second host operating system only comprises:
a kernel of the second operating system, and
software involved upon booting said computer.

9. A method of booting a computer (101) in a system according to claim 7, the method comprising, upon connection (S2) of the user portable device to the computer (101):

letting the bootloader (16) of the user portable device (10) be detected (S3) by the firmware (122) of the host computer (101), whereby, as per instructions of the bootloader (16) to the firmware, the bootloader transfers (S4) to and executes (S5) at the computer (101), to locate (S6) and execute (S8) a part (BI) of the second host operating system (111-2), such that the second host operating system boots and only the second one of said host operating systems can boot (S8-S11) from the user portable device (10).

10. The method of claim 9, further comprising:

building (S10a-b) an overlay disk (120o) over said physical storage medium (120), said physical storage medium (120) being preferably a physical disk, to mask a portion of said physical storage medium occupied by the first host operating system (111-1), the overlay disk being a physical storage medium software representation backed by said physical storage medium;

running (S11) the second host operating system (111-2e) on the overlay disk (120o) built; and running (S12) software (112) on the second host operating system (111-2e) running.

11. The method of claim 10, further comprising, prior to building the overlay disk:

reading (S10a) partition information (111-1p) of the physical storage medium (120);

deducing (S10b) from said partition information where the second host operating system (111-2) is located on said physical storage medium, preferably by calculating a size (s1) of a first portion occupied by the first host operating system on said physical storage medium; and building (S10c) the overlay disk such that the latter
starts on a sector (fs2) of the physical storage medium after, preferably immediately after a last sector (ls1) occupied by the first host operating system, and
preferably continues until the end of the physical storage medium.

12. The method of claim 10, wherein running software on the second host operating system further comprises:

running (S12) a virtual machine (112) as a guest operating system on the second host operating system (111-2e), which guest operating system encapsulates an executable environment.

13. The method of claim 12, wherein
the first host operating system (111-1) is a personal operating system; and
the second operating system (111-2) is a corporate operating system;
and wherein,
running the virtual machine (112) results in displaying a desktop pertaining to a given user.

14. A computer program product comprising a non-transitory computer-readable storage medium having a bootloader (16) embodied therewith, wherein the bootloader (16):

is detectable (S3) by a firmware (122) of a computer (101); and comprises instructions for said firmware (122) to load (S4) the bootloader (16) into a memory (121) of the computer (101) for subsequent execution (S5); and to interact with the firmware, upon execution at the computer (101), to:

determine, in a physical storage medium (120) of said computer (101) storing a first host operating system (111-1) and a second host operating system (111-2) respectively on a first portion (120-1) and a second portion (120-2) thereof, said second portion (120-2), from partition information (111-1p) of said physical storage medium, which partition information acknowledges the first host operating system but does not acknowledge the second host operating system;

locate a part (BI) of the second host operating system (111-2) in the second portion (120-2); and execute said part (BI), whereby only the second host operating system can boot (S6-S8) upon execution of the bootloader at the computer (101), wherein the bootloader is furthermore configured, upon execution at said computer (101), to calculate a size of the first portion based on partition information (111-1p) of the physical storage medium, and deduce which sector (ls1) is the last sector used by the first operating system.

* * * * *